(12) United States Patent
Moore et al.

(10) Patent No.: US 7,565,642 B2
(45) Date of Patent: Jul. 21, 2009

(54) RULE ENGINE

(75) Inventors: Eric A. Moore, Los Angeles, CA (US); Pedram Abrari, Redwood Shores, CA (US)

(73) Assignee: Corticon Technologies, Inc., Redwood City, CA (US)

( * ) Notice: Subject to any disclaimer, the term of this patent is extended or adjusted under 35 U.S.C. 154(b) by 1017 days.

(21) Appl. No.: 10/639,674

(22) Filed: Aug. 11, 2003

(65) Prior Publication Data
US 2004/0034848 A1 Feb. 19, 2004

Related U.S. Application Data

(60) Provisional application No. 60/402,160, filed on Aug. 9, 2002.

(51) Int. Cl.
*G06F 9/44* (2006.01)
*G06F 17/00* (2006.01)
(52) U.S. Cl. .................. 717/117; 706/47; 706/48
(58) Field of Classification Search .................. 717/117
See application file for complete search history.

(56) References Cited

U.S. PATENT DOCUMENTS 4,924,408 A * 5/1990 Highland .................. 706/60
5,423,041 A * 6/1995 Burke et al. ............... 717/117
5,442,792 A * 8/1995 Chun ....................... 717/155
2002/0107754 A1* 8/2002 Stone ....................... 705/26
2004/0260667 A1* 12/2004 Huelsman et al. ........... 706/47
2005/0043965 A1* 2/2005 Heller et al. ................ 705/2

FOREIGN PATENT DOCUMENTS

EP 0 355 287 A 2/1990

OTHER PUBLICATIONS

Edward Allen Luke, "A Ruke-based specification system for computational fluid dynamics", Dec. 1999, pp. 24-28 and pp. 36-40, [retrieved on Oct. 26, 2006]. Retrieved from the internet: <http://www.erc.msstate.edu/~lush/publications/Luke_PhD_Thesis.ps.gz>.*
Gerald Kiernan, Christophe de Maindreville, "Compiling a Rule Database Program into a C/SQL Application", Proceedings of the International Conference on Data Engineering, Kobe, Japan, Apr. 8-12, 1991, pp. 388-395.
International Search Report, PCT/US03/25076, May 11, 2004, 4 pages.

* cited by examiner

*Primary Examiner*—Tuan Q Dam
*Assistant Examiner*—Zheng Wei
(74) *Attorney, Agent, or Firm*—Fish & Richardson P.C.

(57) ABSTRACT

Methods and apparatus, including computer program products, for inference processing in a fact-based business automation system, including receiving a rule set as a single package, generating a dependency graph for the rule set, and generating a sequence of processing logic for optimal processing of inputted facts.

20 Claims, 22 Drawing Sheets

| ProfilePerson | | | | | |
|---|---|---|---|---|---|
| Rules | | | | | |
| | Conditions | Values | 1 | 2 | 3 |
| 1 | Person.smoker | { T , F } | T | - | |
| 2 | Person.age | { < 30 , >= 30 } | - | < 30 | |
| 3 | Person.sex | { 'M' , 'F' } | - | 'F' | |
| 4 | Person.married | { T , F } | - | T | |
| | Actions | Values | | | |
| 1 | Person.risk | { 'High' , 'Low' } | 'High' | 'Low' | |
| | | Overrides | | | |
| Rule Statements | | | | | |
| ID | Text | | | | |
| 1 | A smoker is High risk. | | | | |
| 2 | A married woman youner than 30 is Low risk. | | | | |

FIG. 4

| | | | | 420 | | | |
|---|---|---|---|---|---|---|---|
| Reject | | | | | | | |
| Rules | | | | | | | |
| | Conditions | | Values | | 1 | 2 | 3 |
| 1 | Person.risk | | { 'High' , 'Low' } | | 'High' | | |
| 2 | | | | | | | |
| 3 | | | | | | | |
| | Actions | | Values | | | | |
| 1 | Person.reject | | { T , F } | | T | | |
| 2 | | | | | | | |
| | | | | Overrides | | | |
| Rule Statements | | | | | | | |
| ID | Text | | | | | | |
| 1 | A high risk person is rejected. | | | | | | |

| ProfilePerson | | | | | |
|---|---|---|---|---|---|
| Rules | | | | | |
| | Conditions | Values | 1 | 2 | 3 |
| 1 | Person.smoker | { T, F } | T | - | |
| 2 | Person.age | { < 30, >= 30 } | - | < 30 | |
| 3 | Person.sex | { 'M', 'F' } | - | 'F' | |
| 4 | Person.married | { T, F } | - | T | |
| | Actions | Values | | | |
| 1 | Person.risk | { 'High', 'Low' } | 'High' | 'Low' | |
| | | Overrides | | | |
| Rule Statements | | | | | |
| ID | Text | | | | |
| 1 | A smoker is High risk. | | | | |
| 2 | A married woman youner than 30 is Low risk. | | | | |

| T |
|---|
| < 30 |
| 'F' |
| T |
| 'High' |

| T |
|---|
| < 30 |
| 'F' |
| T |
| 'Low' |

| ProfilePerson | | | | | |
|---|---|---|---|---|---|
| Rules | | | | | |
| | Conditions | Values | 1 | 2 | 3 |
| 1 | Person.smoker | { T , F } | T | - | |
| 2 | Person.age | { < 30 , >= 30 } | - | < 30 | |
| 3 | Person.sex | { 'M' , 'F' } | - | 'F' | |
| 4 | Person.married | { T , F } | - | T | |
| | Actions | Values | | | |
| 1 | Person.risk | { 'High' , 'Low' } | 'High' | 'Low' | |
| | | Overrides | 2 | | |
| Rule Statements | | | | | |
| ID | Text | | | | |
| 1 | A smoker is High risk. | | | | |
| 2 | A married woman younger than 30 is Low risk. | | | | |

Person( Mary, 20, Female, Married, Smoker )

*— 450*

| ProfilePerson | | | | | | | | |
|---|---|---|---|---|---|---|---|---|
| Rules | | | | | | | | |
| | Conditions | Values | 1 | 2 | 3 | 4 | 5 | |
| 1 | Person.smoker | { T , F } | T | - | F | F | F | |
| 2 | Person.age | { < 30 , >= 30 } | - | < 30 | - | >= 30 | - | |
| 3 | Person.sex | { 'M' , 'F' } | - | 'F' | 'M' | - | - | |
| 4 | Person.married | { T , F } | - | T | - | - | F | |
| | Actions | Values | | | | | | |
| 1 | Person.risk | { 'High' , 'Low' } | 'High' | 'Low' | | | | |
| | | Overrides | | | | | | |
| Rule Statements | | | | | | | | |
| ID | Text | | | | | | | |
| 1 | A smoker is High risk. | | | | | | | |
| 2 | A married woman youner than 30 is Low risk. | | | | | | | |

FIG. 8

Person( Mary, 20, Female, Married, Smoker )

Person( Jane, 40, Female, Married, Non-smoker )

5 Other Scenarios

Business Rules
1. People who smoke are High risk.
2. People younger than 30, female, and married are Low risk.
3. Reject High risk people.

Rules (Formal Logic)

| 10 | 1. | *Person.risk = null* | AND | |
| | | Person.smoker = T | | ➔ Person.risk = High |
| 5 | 2. | *Person.risk = null* | AND | |
| | | Person.age < 30 | AND | |
| | | Person.sex = F | AND | |
| | | Person.married = T | | ➔ Person.risk = Low |
| 1 | 3. | Person.risk = High | | ➔ Person.reject = T |

 Use Priorities (& Additional Logic) to Implement Overrides

FIG. 10    (470)

```
import com.corticon.crml.*;
import com.corticon.reactor.engine.*;
import com.corticon.reactor.util.*;
import com.corticon.reactor.MaxLoopsExceededException;

class ProfilePerson implements IRulesheetExe {
        public void execute(TupleSetManager lTSMgr)
                throws CcReactorEngineException,MaxLoopsExceededException {
                DataManager aDataMgr = lTSMgr.getDataMgr();
                boolean jumpOut;
                int runs = 0;
                int level = 1;
                boolean active = true;
                while (runs == 0 || aDataMgr.isModified()) {
                        if(!active) level++;
                        active=false;
                        lTSMgr.genTupleSet("b","Borrower");
                        String[] lstrArr00000001 = {"b"};

lTSMgr.joinTupleSets("ProfilePerson_nonconditional_040",lstrArr00000001);
                        if (runs==0){
                                lTSMgr.actOnTupleSet("ProfilePerson_nonconditional_040",
                                classProfilePerson_nonconditional_040);
                                active=true;
                                aDataMgr.clearWatch("ProfilePerson_nonconditional_040");
                        }
                        lTSMgr.genTupleSet("Loan");
                        lTSMgr.extendTupleSet("Loan.borrower","Loan","borrower");
                        String[] lstrArr00000002 = {"Loan.borrower"};

lTSMgr.joinTupleSets("ProfilePerson_nonconditional_041",lstrArr00000002);
                        if (runs==0){
                                lTSMgr.actOnTupleSet("ProfilePerson_nonconditional_041",
                                classProfilePerson_nonconditional_041);
                                active=true;
                                aDataMgr.clearWatch("ProfilePerson_nonconditional_041");
                        }
                        lTSMgr.restrictTupleSet("b",
                                "ProfilePerson_condition_048values_2__006",
                                classProfilePerson_condition_048values_2__006);
                        String[] lstrArr00000003 =
{"ProfilePerson_condition_048values_2__006",};

lTSMgr.unionTupleSets("ProfilePerson_rule_066ProfilePerson_condition_048",
                                lstrArr00000003);
                        String[] lstrArr00000004 =
                                {"b","ProfilePerson_rule_066ProfilePerson_condition_048"};
                        lTSMgr.joinTupleSets("ProfilePerson_rule_066",lstrArr00000004);
                        if (runs==0) {
                                aDataMgr.clearWatch("ProfilePerson_rule_066");
                                jumpOut = lTSMgr.actOnTupleSet("ProfilePerson_rule_066",
                                classProfilePerson_then_062);
                                active=true;
                        }
                        if (runs==0) {
                                jumpOut = lTSMgr.actOnTupleSet("ProfilePerson_rule_066",
                                        classProfilePerson_then_063);
                                active=true;
                        }
                        lTSMgr.restrictTupleSet("b",
                                "ProfilePerson_condition_045values_1__004",
                                classProfilePerson_condition_045values_1__004);
                        String[] lstrArr00000005 =
{"ProfilePerson_condition_045values_1__004",};

lTSMgr.unionTupleSets("ProfilePerson_rule_061ProfilePerson_condition_045",
                                lstrArr00000005);
                        String[] lstrArr00000006 =
                                {"b","ProfilePerson_rule_061ProfilePerson_condition_045"};
                        lTSMgr.joinTupleSets("ProfilePerson_rule_061",lstrArr00000006);
                        lTSMgr.subtractTupleSet("ProfilePerson_rule_061",
                                "ProfilePerson_rule_066");
                        if (runs==0) {
                                aDataMgr.clearWatch("ProfilePerson_rule_061");
                                jumpOut = lTSMgr.actOnTupleSet("ProfilePerson_rule_061",
                                classProfilePerson_then_057);
                                active=true;
                        }
```

FIG. 14

```
    if (runs==0) {
                                jumpOut = lTSMgr.actOnTupleSet("ProfilePerson_rule_061",
                                classProfilePerson_then_058);
                                active=true;
                    } lTSMgr.restrictTupleSet("b","ProfilePerson_condition_042values_0__001",
                                classProfilePerson_condition_042values_0__001);
                            String[] lstrArr00000007 =
{"ProfilePerson_condition_042values_0__001",};

lTSMgr.unionTupleSets("ProfilePerson_rule_056ProfilePerson_condition_042",
                                lstrArr00000007);
                            String[] lstrArr00000008 =
                                {"b","ProfilePerson_rule_056ProfilePerson_condition_042"};
                            lTSMgr.joinTupleSets("ProfilePerson_rule_056",lstrArr00000008);
                            lTSMgr.subtractTupleSet("ProfilePerson_rule_056",
                                "ProfilePerson_rule_061");
                            lTSMgr.subtractTupleSet("ProfilePerson_rule_056",
                                "ProfilePerson_rule_066");
                            if (runs==0) {
                                aDataMgr.clearWatch("ProfilePerson_rule_056");
                                jumpOut = lTSMgr.actOnTupleSet("ProfilePerson_rule_056",
                                        classProfilePerson_then_052);
                                active=true;
                            }
                            if (runs==0) {
                                jumpOut = lTSMgr.actOnTupleSet("ProfilePerson_rule_056",
                                        classProfilePerson_then_053);
                                active=true;
                            }
                            runs++;
                            if (runs ==100)
                                throw new MaxLoopsExceededException("Max Loops Exceeded");
                    }
            } class ProfilePerson_nonconditional_040 implements IAction {
                    public void fire(Tuple lTuple,DataManager aDataMgr) {
                            GenericEntity new_Loan =
aDataMgr.addNewEntity(lTuple,"Loan");
                            GenericEntity Loan = lTuple.getEntity("Loan");
                            if (Loan == null) return ;
                            GenericEntity b = lTuple.getEntity("b");
                            if (b == null) return ;
                            b.setAssociation("loan",new_Loan);
                    }
            } class ProfilePerson_nonconditional_041 implements IAction {
                    public void fire(Tuple lTuple,DataManager aDataMgr) {
                            GenericEntity Loan = lTuple.getEntity("Loan");
                            if (Loan == null) return ;;
                            GenericEntity Loan_borrower =
lTuple.getEntity("Loan.borrower");
                            if (Loan_borrower == null) return ;;
                            Loan_borrower.setAttribute("name","Eric");
                    }
            } public class ProfilePerson_condition_048values_2__006 implements
ICondition {
                    public boolean test(Tuple lTuple,DataManager aDataMgr) {
                            GenericEntity b = lTuple.getEntity("b");
                            if (b == null) return false;
                            BigDecimal b__monthlyDebt =
                                (BigDecimal)b.getAttribute("monthlyDebt");
                            if (b__monthlyDebt == null) return false;
                            return b__monthlyDebt.compareTo(
                                (Object)new BigInteger("3000"))> 0 ;
                    }
            }
```

FIG. 14 (cont.)

```
class ProfilePerson_then_062 implements IAction {
        public void fire(Tuple lTuple,DataManager aDataMgr) {
                GenericEntity b = lTuple.getEntity("b");
                if (b == null) return ;;

b.setAttribute("dProfile","noway");
        }
} class ProfilePerson_then_063 implements IAction {
        public void fire(Tuple lTuple,DataManager aDataMgr) {
                GenericEntity b = lTuple.getEntity("b");
                if (b == null) return ;;

aDataMgr.addNewMessage("Info","High Debtors have no chance",b);
        }
}
public class ProfilePerson_condition_045values_1__004 implements ICondition {
        public boolean test(Tuple lTuple,DataManager aDataMgr) {
                GenericEntity b = lTuple.getEntity("b");
                if (b == null) return false;
                BigDecimal b__monthlyIncome =
                        (BigDecimal)b.getAttribute("monthlyIncome");;
                if (b__monthlyIncome == null) return false;
                return b__monthlyIncome.compareTo(
                        (Object)new BigInteger("3000"))> 0 ;
        }
} class ProfilePerson_then_057 implements IAction {
        public void fire(Tuple lTuple,DataManager aDataMgr) {
                GenericEntity b = lTuple.getEntity("b");
                if (b == null) return ;
                b.setAttribute("dProfile","low");
        }
} class ProfilePerson_then_058 implements IAction {
        public void fire(Tuple lTuple,DataManager aDataMgr) {
                GenericEntity b = lTuple.getEntity("b");
                if (b == null) return ;
                aDataMgr.addNewMessage("Info",
                "High income people are lower risk.",b);
        }
} public class ProfilePerson_condition_042values_0__001 implements ICondition {
        public boolean test(Tuple lTuple,DataManager aDataMgr) {
                GenericEntity b = lTuple.getEntity("b");
                if (b == null) return false;
                BigInteger b__age = (BigInteger)b.getAttribute("age");
                if (b__age == null) return false;
                return b__age.compareTo((Object)new BigInteger("25"))< 0 ;
        }
} class ProfilePerson_then_052 implements IAction {
        public void fire(Tuple lTuple,DataManager aDataMgr) {
                GenericEntity b = lTuple.getEntity("b");
                if (b == null) return ;
                b.setAttribute("dProfile","high");
        }
} class ProfilePerson_then_053 implements IAction {
        public void fire(Tuple lTuple,DataManager aDataMgr) {
                GenericEntity b = lTuple.getEntity("b");
                if (b == null) return ;
                aDataMgr.addNewMessage("Info","Younger people are higher risk.",b);
        }
}
```

FIG. 14 (cont.)

```
IAction classProfilePerson_nonconditional_040 = new ProfilePerson_nonconditional_040();

IAction classProfilePerson_nonconditional_041 = new
ProfilePerson_nonconditional_041();

ICondition classProfilePerson_condition_048values_2__006 =
            new ProfilePerson_condition_048values_2__006();

IAction classProfilePerson_then_062 = new ProfilePerson_then_062();

IAction classProfilePerson_then_063 = new ProfilePerson_then_063();
        ICondition classProfilePerson_condition_045values_1__004 =
            new ProfilePerson_condition_045values_1__004();

IAction classProfilePerson_then_057 = new ProfilePerson_then_057();

IAction classProfilePerson_then_058 = new ProfilePerson_then_058();

ICondition classProfilePerson_condition_042values_0__001 =
            new ProfilePerson_condition_042values_0__001();

IAction classProfilePerson_then_052 = new ProfilePerson_then_052();

IAction classProfilePerson_then_053 = new ProfilePerson_then_053();
```

FIG. 14 (cont.)

```
from com.corticon.crml import OclString
from com.corticon.crml import OclDate
from com.corticon.crml import OclLiteral
from com.corticon.crml import BigInteger
from com.corticon.crml import BigDecimal
from com.corticon.reactor.engine import ICondition
from com.corticon.reactor.engine import IAction
from com.corticon.reactor.engine import IQualifier
from com.corticon.reactor.util import IRulesheetExe
from com.corticon.reactor import MaxLoopsExceededException
from java.lang import Boolean
from java.lang import String class ProfilePerson(IRulesheetExe):
    def execute(self, lTSMgr):
        "@sig public void execute(com.corticon.reactor.engine.TupleSetManager lTSMgr)"
        aDataMgr = lTSMgr.getDataMgr()
        runs = 0
        level = 1
        active = 1
        while (runs == 0 or aDataMgr.isModified()):
            if(not active):
                level+=1
            active=0
            lTSMgr.genTupleSet('Person')
            lTSMgr.restrictTupleSet('Person',
                    'ProfilePerson_condition_021values_0__017',
                    self.classProfilePerson_condition_021values_0__017)
            lTSMgr.unionTupleSets('ProfilePerson_rule_033ProfilePerson_condition_021',
                    ['ProfilePerson_condition_021values_0__017'])
            lTSMgr.joinTupleSets('ProfilePerson_rule_033',
                    ['Person','ProfilePerson_rule_033ProfilePerson_condition_021'])
            if (runs==0):
                aDataMgr.clearWatch('ProfilePerson_rule_033')
                jumpOut =
            lTSMgr.actOnTupleSet('ProfilePerson_rule_033',
                    self.classProfilePerson_then_030)
            active=1
            lTSMgr.restrictTupleSet('Person',
                    'ProfilePerson_condition_024values_1__019',
                    self.classProfilePerson_condition_024values_1__019)
            lTSMgr.restrictTupleSet('Person',
                    'ProfilePerson_condition_026values_2__022',
                    self.classProfilePerson_condition_026values_2__022)
            lTSMgr.restrictTupleSet('Person',
                    'ProfilePerson_condition_028values_3__023',
                    self.classProfilePerson_condition_028values_3__023)
            lTSMgr.unionTupleSets('ProfilePerson_rule_041ProfilePerson_condition_024',
                    ['ProfilePerson_condition_024values_1__019'])
            lTSMgr.unionTupleSets('ProfilePerson_rule_041ProfilePerson_condition_026',
                    ['ProfilePerson_condition_026values_2__022'])
            lTSMgr.unionTupleSets('ProfilePerson_rule_041ProfilePerson_condition_028',
                    ['ProfilePerson_condition_028values_3__023'])
            lTSMgr.joinTupleSets('ProfilePerson_rule_041',
                    ['Person','ProfilePerson_rule_041ProfilePerson_condition_024',
                    'ProfilePerson_rule_041ProfilePerson_condition_026',
                    'ProfilePerson_rule_041ProfilePerson_condition_028'])
            if (runs==0):
                aDataMgr.clearWatch('ProfilePerson_rule_041')
            jumpOut =
            lTSMgr.actOnTupleSet('ProfilePerson_rule_041',
                    self.classProfilePerson_then_034)
            active=1
            runs+=1
            if(runs == 0):
                lTSMgr.clear()
            if (runs ==100):
                raise MaxLoopsExceededException('Max Loops Exceeded')
```

```
def __init__(self):
    class ProfilePerson_condition_021values_0__017(ICondition):
        def test(this,lTuple,aDataMgr):
            "@sig public boolean test(
                    com.corticon.reactor.engine.Tuple lTuple,
                    com.corticon.reactor.engine.DataManager aDataMgr)"
            Person = lTuple.getEntity('Person')
            if Person == None : return 0
            Person__smoker = Person.getAttribute('smoker')
            if Person__smoker == None : return 0
            return Person__smoker
    self.classProfilePerson_condition_021values_0__017=
        ProfilePerson_condition_021values_0__017()

class ProfilePerson_then_030(IAction):
        def fire(this,lTuple,aDataMgr):
            "@sig public void fire(
                    com.corticon.reactor.engine.Tuple
                    lTuple,com.corticon.reactor.engine.DataManager
                    aDataMgr)"
            Person = lTuple.getEntity('Person')
            if Person == None : return None Person__risk = Person.setAttribute('risk','High')

self.classProfilePerson_then_030=ProfilePerson_then_030()
    class ProfilePerson_condition_024values_1__019(ICondition):
        def test(this,lTuple,aDataMgr):
            "@sig public boolean test(
                    com.corticon.reactor.engine.Tuple lTuple,
                    com.corticon.reactor.engine.DataManager aDataMgr)"
            Person = lTuple.getEntity('Person')
            if Person == None : return 0
            Person__age = Person.getAttribute('age')
            if Person__age == None : return 0
            return Person__age.compareTo(BigInteger('30'))< 0
    self.classProfilePerson_condition_024values_1__019=
        ProfilePerson_condition_024values_1__019()

class ProfilePerson_condition_026values_2__022(ICondition):
        def test(this,lTuple,aDataMgr):
            "@sig public boolean test(
                    com.corticon.reactor.engine.Tuple lTuple,
                    com.corticon.reactor.engine.DataManager aDataMgr)"
            Person = lTuple.getEntity('Person')
            if Person == None : return 0
            Person__sex = Person.getAttribute('sex')
            if Person__sex == None : return 0
            return Person__sex=='F'
    self.classProfilePerson_condition_026values_2__022=
        ProfilePerson_condition_026values_2__022()

class ProfilePerson_condition_028values_3__023(ICondition):
        def test(this,lTuple,aDataMgr):
            "@sig public boolean test(
                    com.corticon.reactor.engine.Tuple lTuple,
                    com.corticon.reactor.engine.DataManager aDataMgr)"
            Person = lTuple.getEntity('Person')
            if Person == None : return 0
            Person__married = Person.getAttribute('married')
            if Person__married == None : return 0
            return Person__married
    self.classProfilePerson_condition_028values_3__023=
        ProfilePerson_condition_028values_3__023()
```

FIG. 15 (cont.)

```
class ProfilePerson_then_034(IAction):
            def fire(this,lTuple,aDataMgr):
                    "@sig public void fire(
                            com.corticon.reactor.engine.Tuple lTuple,
                            com.corticon.reactor.engine.DataManager aDataMgr)"
                    Person = lTuple.getEntity('Person')
                    if Person == None : return None Person__risk = Person.setAttribute('risk','Low')

self.classProfilePerson_then_034=ProfilePerson_then_034()
        self.ok = 1
```

FIG. 15 (cont.)

RULE ENGINE

RELATED APPLICATION

This application claims priority under 35 USC §119(e)(1), to U.S. Provisional Patent Application Ser. No. 60/402,160, filed on Aug. 9, 2002, the entire contents of which are hereby incorporated by reference.

TECHNICAL FIELD

This invention relates to a rule engine.

BACKGROUND

A knowledge base contains encoded knowledge. In a rule-based expert system, the knowledge base typically incorporates definitions of facts and rules along with control information. An inference engine (sometimes referred to as a rule interpreter or rule engine) provides a reasoning mechanism in an expert system. In a rule based expert system, the inference engine typically implements forward chaining and backward chaining strategies. Forward chaining is a process of applying a set of previously determined rules to the facts in a knowledge base to see if any of them fire and thereby generate new facts. In essence, all derivable knowledge is derived in forward chaining. Backward chaining is goal-driven and used to process some queries against the knowledge base. A query is considered a goal and the knowledge base is searched for facts supporting that goal. Antecedents of such rules are made subgoals for further search if necessary. Inference engines designed for expert systems are increasingly used in business automation.

SUMMARY

In an aspect, the invention features a method including, in a processing system, receiving a rule set as a single package, generating a dependency graph for the rule set, and generating a sequence of processing logic for optimal processing of inputted facts.

One or more of the following features can be included. Processing can include single pass execution when there are no logical loops. Processing can include multi-pass execution when there are logical loops. Processing can also include providing an endless loop terminating condition. Generating the dependency graph can include determining logical dependencies across rules contained in the rule set. Generating the dependency graph further can include resolving logical conflicts using override instructions. Generating the dependency graph further can include analyzing the rule set with a business logic generation utility optimized for one of a plurality of target programming languages and generating optimized business logic for a selected target programming language. The target programming language can be Java, C++, C#, Jython, JavaScript and Visual Basic. The business logic generation utility's generated processing logic can include a series of calls to a working memory database to retrieve, manipulate and update data.

In another aspect, the invention features a method for automating business processes including, in a computer system, receiving a rule set as a single package, determining logical conflicts within the rule set, resolving the logical conflicts, and generating a sequence of processing logic from the rule set for optimal processing of inputted facts.

One or more of the following features can be included. Resolving can include determining override conditions in rule collision events. Generating can include analyzing the rule set with a business logic generation utility optimized for one of a plurality of target programming languages and generating optimized business logic for the selected target programming language. The target programming language can be Java, C++, C#, Jython, JavaScript and Visual Basic. The business logic generation utility's generated processing logic can include a series of calls to a working memory database to retrieve, manipulate and update data.

The details of one or more embodiments of the invention are set forth in the accompanying drawings and the description below. Other features and advantages of the invention will be apparent from the description and drawings, and from the claims.

DESCRIPTION OF DRAWINGS

FIG. 4 is a business rulesheet for a profiling example.
FIG. 5 is a business rulesheet for a rejection example.
FIG. 6 is a conflict detection rulesheet view of FIG. 4.
FIG. 7 is a conflict resolution rulesheet view of FIG. 4.
FIG. 8 is a completeness check rulesheet view of FIG. 4.
FIG. 10 shows a set of three sample business rules.
FIG. 14 is example generated Java logic for processing rules in FIG. 10.
FIG. 15 is example generated Jython logic for processing rules in FIG. 10.

Like reference symbols in the various drawings indicate like elements.

DETAILED DESCRIPTION

Figure 1:
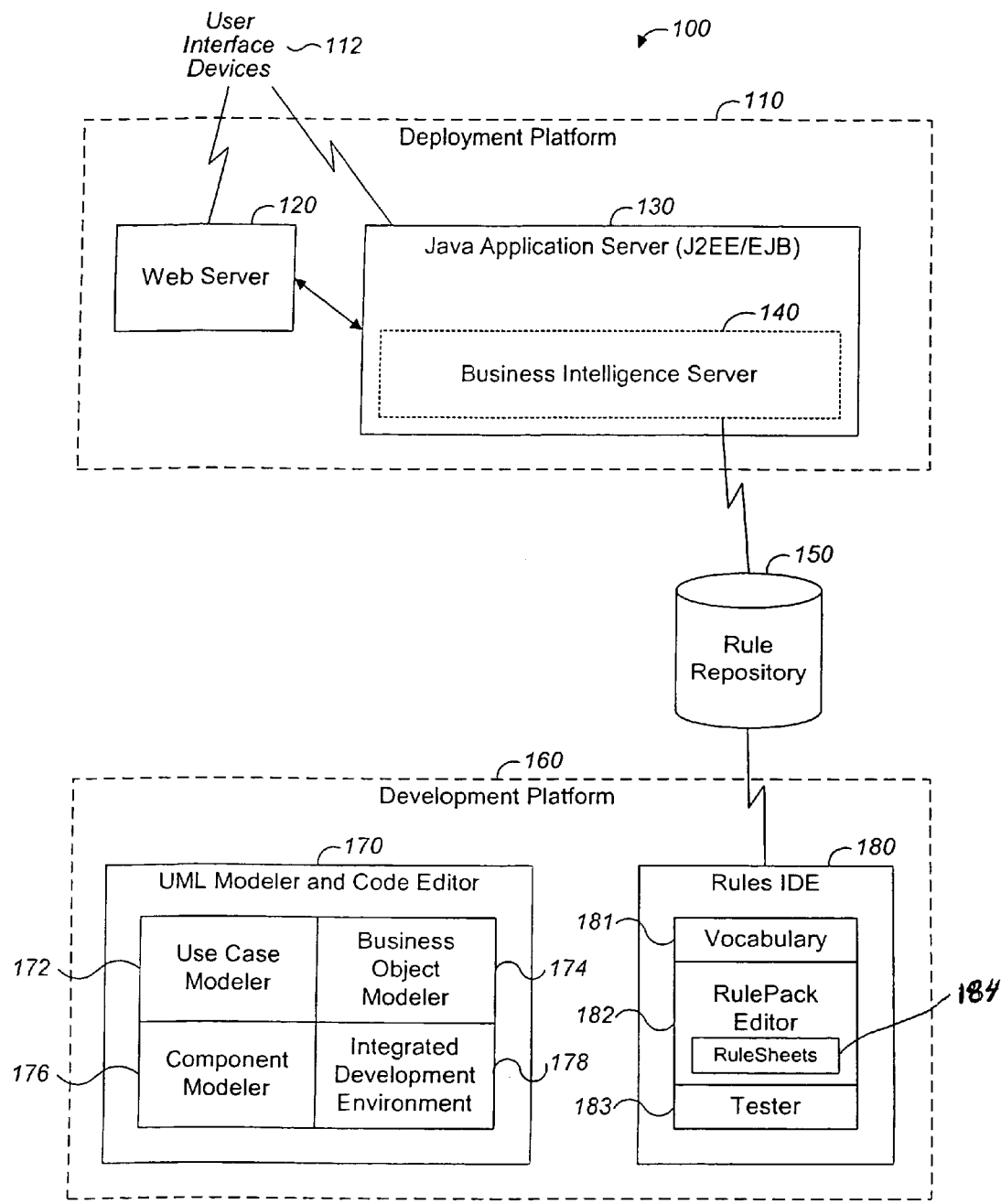
FIG. 1 is a block diagram of a platform.

As shown in FIG. 1, a platform 100 includes a deployment platform 110 and a development platform 160. Each platform 110, 160 is further subdivided into application tiers, i.e., a front end (presentation), a middle tier (business logic), and a back end (database).

The front end of the development platform 160 is provided by products used for rapid development of graphical user interfaces (GUIs), such as the Microsoft FrontPage® web site generation tool.

The middle tier of the development platform 160 implements a business logic of an application. The development platform 160 implements a visually declarative approach. With the development platform 160, business logic can be subdivided into business rules and process logic.

The process logic is included in a UML Modeler and Code Editor 170. The UML Modeler and Code Editor 170 includes a use case modeler 172, a business object modeler 174, a component modeler 176 and an Integrated Development Environment (IDE) 178.

Business rules, which often make up the bulk of business logic, are built and maintained in the visually declarative environment in a rules integrated development environment (IDE) 180. This allows non-technical developers, such as business experts and analysts, to generate and maintain enterprise business rules as reusable, adaptable components, which we refer to as rulepacks. Rulepacks are declarative components that encapsulate a set of business rules automating the knowledge of a particular context of a business process. Rulepacks are made up of one or more rulesheets 184. Each rulesheet can contain one or more rules that apply within the same particular scope. Rulepacks are built and maintained by the rules IDE 180.

The rules IDE 180 includes a vocabulary 181, which represents business entities, their attributes, relationships, and possibly business methods in a form of a tree view. The vocabulary 181 can be generated within the rules IDE 180 or imported from the Unified Modeling Language (UML) business object modeler (also known as a class diagram) 174 or generated directly from business objects or a relational database. The vocabulary 181 serves as an optimal drag-and-drop source for easy generation of rulesheets 184. The rules IDE 180 also includes the rulepack/rulesheet editor 182, which is a visual environment designed to be used by non-technical business experts to build and maintain rulepacks and their rulesheets. A rulesheet is a spreadsheet-like construct for intuitive development of logically correct sets of rules. In an example, rulepacks are implemented as extensible markup language (XML) documents expressed in a rules markup language generated for that purpose. The rules markup language defines an XML rules interchange format similar to that of the Business Rules Markup Language (BRML), which is defined by the CommonRules Java library, available from International Business Machines Corporation of Armonk, N.Y.

A rule repository 150 facilitates collaborative rules development through source and version control, allowing generation of authorization and access privileges for rules documents. The rule repository 150 maintains version control, offering an opportunity to roll back to previous versions of rules when necessary. The rule repository 150 can also track a business motivation behind every rule, such as business policy charters and a mission statement.

The process logic part of the business logic is a thin layer of transactional code, and in one implementation, is built and maintained using the UML modeler and code editor 170. When implemented in Enterprise Java architecture, the transactional code (i.e., the process logic) can be coded in Java using any standard Java IDE, such as the Together UML modeling tool and IDE products available from TogetherSoft Corporation of Raleigh, N.C. The TogetherSoft products automatically generate the majority of the process logic (including Enterprise JavaBeans), so programming requirements are reduced to a minimum.

A developer uses the UML modeler and code editor 170 to build and maintain a use case model, a business object model (a UML class diagram), a component model, and various other UML models used to implement a complete enterprise application. For these purposes, the UML modeler and editor 170 includes the use case modeler 172, the business object modeler 174, and the component modeler 176, and other UML modelers (not shown). The UML modeler and editor 170 also includes the IDE (Integrated Development Environment) 178 that supports a Java development kit (JDK), optionally extended with a Java math library to support business domain calculations.

The use case modeler 172 is used to build and maintain business requirements visually in the form of UML-standard use cases. The business object modeler 174 is used to build and maintain an enterprise-level object model of all data elements. The enterprise-level model represents all data in the enterprise and can be generated de nova or derived from existing enterprise databases. The objects of the enterprise-level object model also contain business functions. Business rules that are non-declarative in nature or involve an algorithm or complex mathematical calculation are captured as functions. The procedural component modeler 176 is used to build and maintain those procedural business components that use rulepacks.

The deployment platform 110 supports deployment on diverse distributed user interface devices 112, such as web browsers, telephones, personal digital assistants, and other client programs and access devices. Each user interface device merely communicates with supported middle tier application servers.

As shown in FIG. 1, the middle tier of an application includes a web server 120, a Java application server 130, and a business intelligence server 140. Any web server supporting JSP (Java Server Pages) and any Java application server can be used, such as a J2EE (Java 2 Enterprise Edition) compliant application server.

Figure 2:
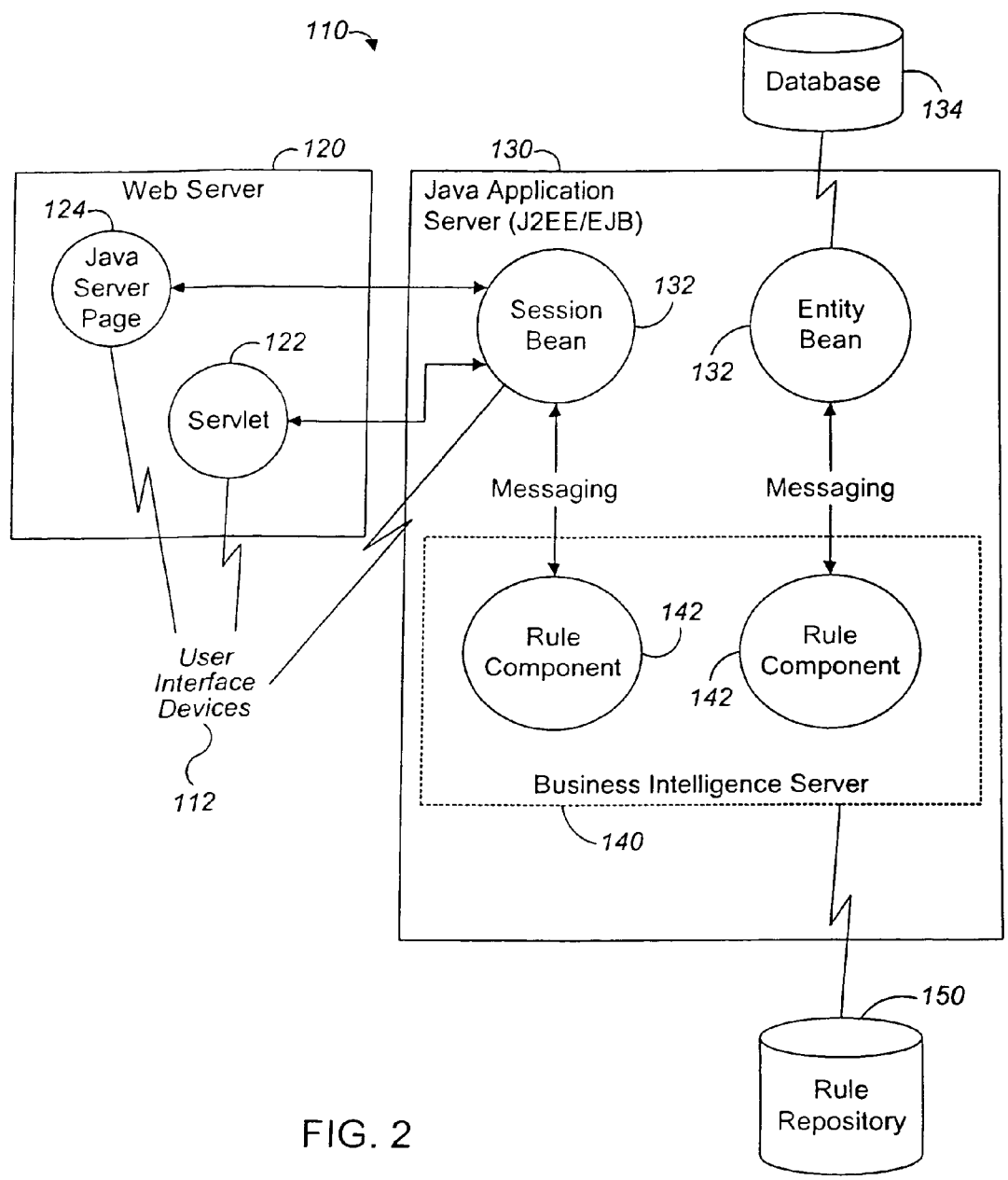
FIG. 2 is a block diagram of a deployment platform.

As shown in FIG. 2, the business intelligence server 140 manages multiple rule components 142. A rule component contains a rule engine instance. A rule component deploys a rulepack as a functional knowledge unit. The multiple rule components 142 are deployed in a J2EE environment 130. A user interface 112 communicates with a servlet 122, which can be generated by a Java Server Page (JSP), which communicates with session and entity beans 132, which in turn communicate with the rule components 142 through a standardized messaging scheme. Two types of messages are supported, i.e., synchronous (e.g., direct Java calls) and asynchronous (e.g., using XML-based messages).

The rule components 142 are preloaded with the rules in a rulepack for optimal performance. The rule components 142 can interact with various types of business components using standardized messaging (e.g., XML messaging). The business intelligence server 140 provides a central integration hub that interacts with diverse application components, such as Microsoft® COM (Component Object Model) components, CORBA (Common Object Request Broker Architecture) components, enterprise JavaBeans (EJB) components, and Java components. The business intelligence server 140 turns any Java application server into an application integrator, acting as a control center for an enterprise information system.

The back end of the deployment platform 110 can include any number of databases 134 based on database management products from any number of vendors. The rule repository 150 is implemented as a database, e.g., a relational database. The business intelligence server 140 is a virtual extension of the rule repository 150, remotely managing the lifecycle of all deployed rule components 142. Once a business rule is modified in the rule repository 150, all rule components containing rulepacks affected by the change are dynamically notified to refresh their business logic. This allows for real-time modification of system behavior without downtime.

A simple application development methodology that takes advantage of the features of the application development platform 100 is now described as an example. Unlike traditional techniques that focus on a combination of data and process, or on objects that encapsulate both data and process, the our methodology places business rules in the center of the development process.

Business rule analysis, as facilitated by the platform 100, accelerates the software development lifecycle by reducing unstructured requirements into concrete statements that are easily verified by business users. In addition, our methodology enables analysts and developers to identify, capture and test business rules from the very inception of a project. In addition, our methodology guarantees that UML-conforming documentation (such as use case models) are generated as an inherent by-product of the software development process. Furthermore, our methodology ensures that the documents remain in synchronization with the application logic because the business rules that the documents represent are part of the application.

By allowing developers to begin building and testing business rules at project inception, our methodology ensures healthy design disciplines, such as providing tangible design deliverables in a project's early phases. Moreover, business rules developed early in the development process are directly incorporated into a final application, resulting in cost savings when compared with traditional "throw away" prototyping techniques.

Figure 3:
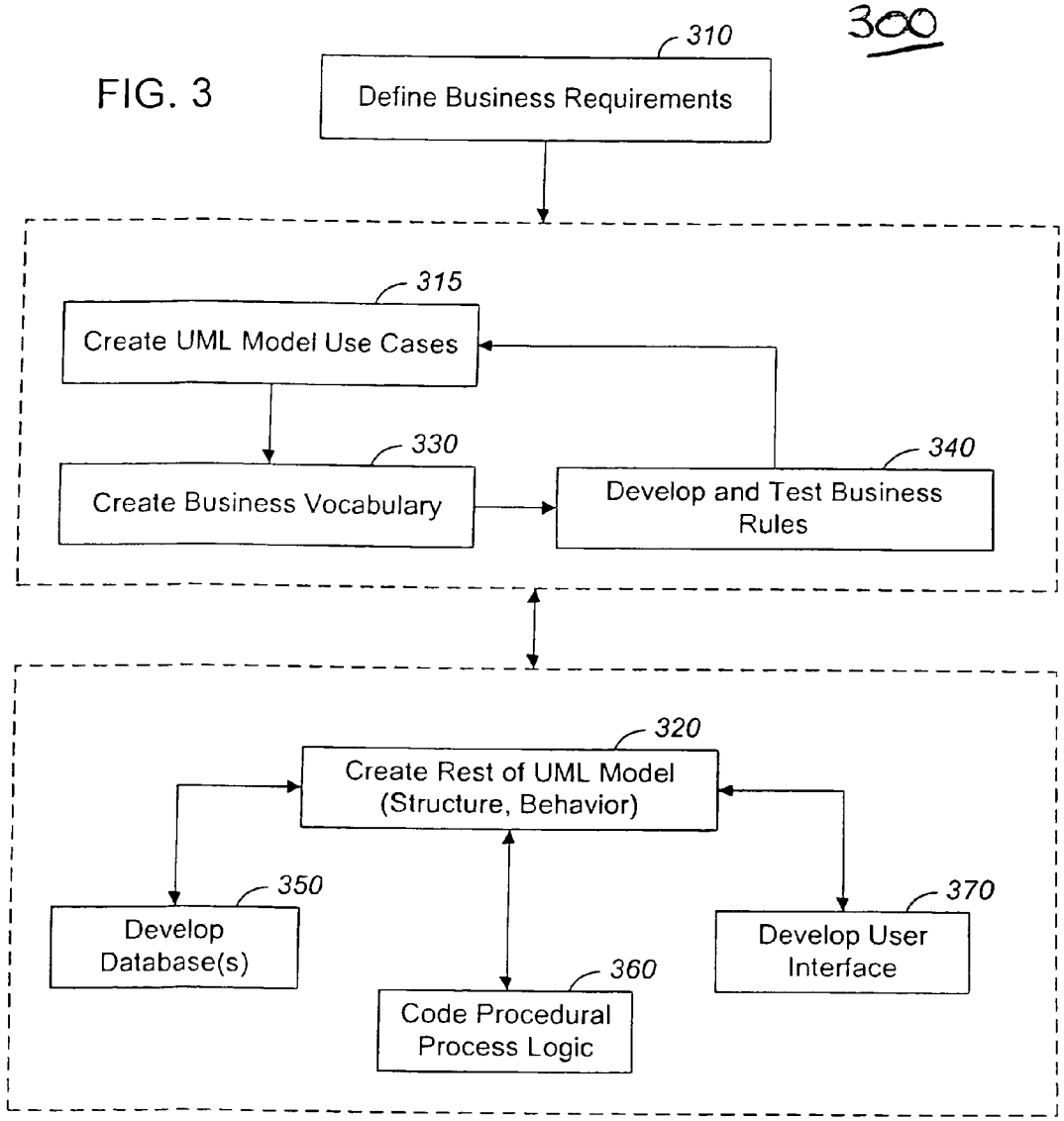
FIG. 3 is flow diagram of an example development project.

As shown in FIG. 3, in an example development project 300, business analysts collaborate with subject matter experts (SMEs) to define (310) high-level business requirements using vocabulary understandable to the SMEs. Having the business requirements, the analysts generate (315) UML use cases using the use case modeler 172, which allows a user to specify actors and their various usages of the system graphically. For each use case the SME and business analyst include a high-level written narrative that explains the use case in clear, concise business terms.

A business object model can be generated de nova or derived (330) from an existing database. The business object modeler 176 can capture the business object model as a UML class diagram. The IDE 180 transforms this into a vocabulary tree view for easy drag-and-drop functionality onto the rulesheets 184. However, the vocabulary can also be generated directly in the rules IDE 180, without the need for an object model.

In the tree view, the vocabulary is displayed in the form of a tree of business terms such as entities (non-leaf nodes), their attributes (leaves), and their relationships to other entities (named branches). Such a tree view presents a conceptual semantic model in a form that is understandable to the business user. The tree view can be used for building rules, test data, user interfaces, databases, and other application components. Elements of the tree view can be used by a user to drag-and-drop vocabulary terms onto a rulesheet. In the tree view, a vocabulary term can be either simple (root-level) or complex (branch-level). When an entity relationship link is drag-and-dropped, relationship traversals are handled automatically using a dot-notation (e.g., person.employer.address) that gives a business term a specific context.

Business rules are developed and tested (340) using the vocabulary 181, the rulepack editor 182, and the tester 183. Business rules are captured as discrete rule sets (rulepacks). Three types of business rules are rejecters (constraints), projectors (triggers), and producers (derivations). The rulepack editor 182 enables developers to compose all types of rules that operate on data structures defined in the business object model. Developers can drag-and-drop terms from the vocabulary tree view 181 onto a rulesheet to define the conditions and actions of each rulepack.

A business rule can be defined as a statement that defines or constrains some aspect of a business. A business process can be considered procedural logic used to retrieve, manipulate and update data in a transactional environment. Business rules are stored in our rule engine. Our rule engine is designed in a top down approach from the business-side to the execution engine. Our rule engine stores rules (also referred to as rulesheets) in a spreadsheet manner using a decision table concept. In general, a decision table (often called a truth table) contains a list of decisions and the criteria on which they are based. All possible situations for decisions are typically listed, and the action to take in each situation is specified. A rudimentary example is, for a traffic intersection, the decision to proceed might be expressed as "yes" or "no" and the criteria might be the "light is red" or the "light is green."

FIG. 4 shows an exemplary profile rulesheet 400. The profile rulesheet 400 captures business rules because it isolates the conditions and actions and is designed to allow one to find conflicts. Conditions 402 are located in a top left side quadrant and actions 404 are located in a bottom left side quadrant. The columns in a right quadrant are the actual implementations of the rules and the rule statements are located in a lower quadrant. In the example shown, a first column 406 shows a smoker is high risk. More specifically, if Person.smoker is true, then Person.risk is high. In the example shown in a second column 408, a married (i.e., Person.married=T) woman (i.e., Person.sex=F) under the age of thirty (i.e., Person.age<30) is low risk (i.e., Person.risk=low). Essentially, the smoker condition in this rule is a "don't care" so a dash indicating "don't care" is placed in the second column 408. Thus, the conditions 402 and columns 406 and 408 represent a formal representation of informal rule statements 1 (410) and 2 (412).

A rulepack containing one or more rulesheets that make up a unit of logic is also called a decision service. Each rulesheet in a decision service is designed to do a particular task analogous to a subroutine in a procedural language. In operation, the rule engine goes from rulesheet to rulesheet until a final rulesheet is reached and processed.

FIG. 5 shows an output of the exemplary rulesheet 400 of FIG. 4 (i.e. Person.risk) and how it flows to an exemplary reject rulesheet 420 that implements a rule statement 422, i.e., a high risk person is rejected, by setting Person.reject=T when Person.risk=High.

FIG. 6 shows an exemplary conflict detection rulesheet 430 of the rulesheet 400 of FIG. 4. A rule editor can detect conflicts and highlight them to the user as shown in FIG. 6. A conflict can be thought of as a logical conflict between two or more rules. In other words, a logical conflict is where there are two or more different rules that, for the same exact fact/data input(s), all rules fire resulting in contradictory and mutually exclusive actions. In the example, both rules fire for a Person who is a smoker, younger than thirty, female and married. Thus, one rule sets the Person.risk=High and one rule sets the Person.risk=Low. When such conflict is detected it can be resolved by engaging an override feature 432.

FIG. 7 shows a conflict resolution rulesheet 440 that illustrates a Person being a smoker is logically more significant than her being a married woman younger than thirty, and therefore the smoker rule overrides the female rule. Thus for such a Person, smoker rule fires and female rule is suppressed.

FIG. 8 shows a completeness check rulesheet 450. A completeness check insures that all logically possible data scenarios have been covered by insuring all possible valid combinations of data are accounted for. In the example, a total of seven possible "simple" scenarios are missing from the rulesheet, which can be compressed to a smallest possible set of three "complex" rules that can include dashes (or "don't cares") for some condition values. Also some conditions can result in a set of values for a rule. The completeness check rulesheet 450 allows a business user to view all possibilities and determine which business rules are important and complete the rulesheet. The way the number of missing rules is detected is that for each condition a complete value set is specified. In the example, for smoker there is {true, false}, for age there is {younger than thirty, thirty and older}, for sex there is {male, female}, and for married there is {true, false}. This gives a total of $2^4$ possibilities, or 16 possibilities. So there are 16 possible "simple" rules, i.e., rules that do not include dashes or "don't cares". The rulesheets can be optimized to reduce the total number of possibilities into a smallest possible rule set.

For example, consider two rules 410 and 412 (of FIG. 4). Let's assume two different rules. A first rule states if a Person is a smoker, younger than 30, female and married then her risk profile is set to 'Low'. A second rule is identical to the first rule except the smoker condition value is different, i.e., if the person is a non-smoker and the other attributes are the same as the first rule then the risk profile is set to 'Low'. In both rules, if the Person is younger than thirty, female and married, whether she is a smoker or not, then her risk profile is set to 'Low'. That means that the smoker condition is irrelevant and does not impact the outcome. This is because for all the smoker condition possibilities (true and false), the risk profile is set to Low. Thus, the two "simple" rules can be collapsed into a single "complex" rule in which the smoker condition is irrelevant (i.e., "don't care") and the total number of rules can be compressed from two to one.

Any set of rules can be compressed into the smallest possible set that is logically equivalent to the original set. The compressed set of rules can have many conditions with a value of "don't care" or a subset of the total possible values. The rule editor implements this approach of rules capture and compression.

Figure 9:
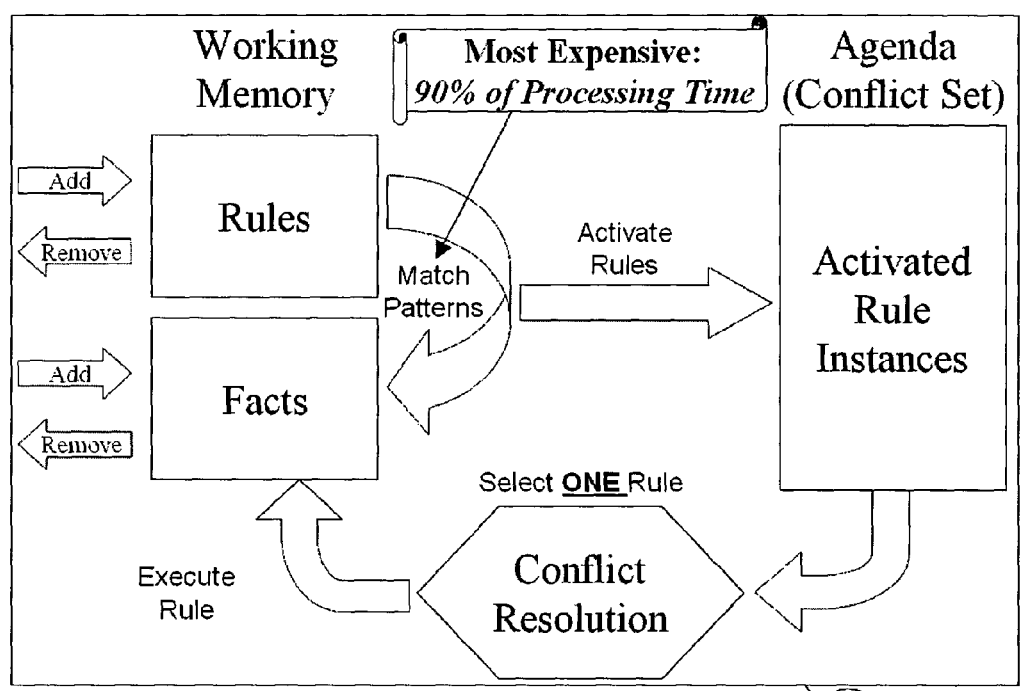
FIG. 9 shows an execution flow for inference engines.

A benefit of the rulesheet approach to rules capture is that the logic of the rules is exposed such that the user can visually see the logical interrelationships across the rules. The user can easily detect logical conflicts and resolve them. In the traditional inference engines and similar approaches, these logical interrelationships can only be discovered indirectly by testing and observing the system behavior. Also, since logical conflicts among rules in traditional systems are handled at runtime, prior inference engines have been designed to perform dynamic conflict resolution. This requirement forces an iterative, one-rule-at-a-time execution design for inference engines, as shown in FIG. 9, which is inefficient for business rules automation. Since the rule editor described above helps the user resolve logical conflicts at capture time, our rule engine does not incorporate dynamic conflict resolution. Dynamic conflict resolution is what inference engines in traditional expert systems have been designed for. The fundamental architecture of traditional inferences engines is inherently suboptimal and slow for business rules automation.

Inference engines are an offshoot of expert systems. Interference engines were designed to solve the expert systems problem. Expert systems are primarily used for "decision support". There is a human user interacting with the system and interpreting the outcome to help him make decisions. The architecture is designed to fail gracefully in cases of logical conflicts. The failure is in the form of inconsistent and non-deterministic behavior. Therefore, logical inconsistencies in the rule set are tolerated. The human expert can add/remove rules to/from the running system. Typically, the expert system is loaded with facts and infers new facts in a long running session. The user requests typically come in the from numerous small messages. Also, typically the number of users is small and scalability is not a major requirement. Due to the fact that individual rules can be added/removed dynamically, prior inference engines are designed to support dynamic conflict resolution.

Inference engines are increasingly used to automate business rules. However, architecturally they were not designed for business automation, where the requirements for a rule engine are drastically different, i.e., the rule engine is used for "decision automation", not "decision support." Typically, there is no human expert to interpret the results. Therefore, the behavior of the rule engine must be deterministic, i.e., that given any particular input there is one and only one possible output. Logical inconsistencies in the rule set are not tolerated and unacceptable. Rule engines are typically used as stateless "decision services". The client requests are typically in the form of one large message in and one large message out. Business rule engines must also be very scalable as opposed to inference engines in expert systems. Furthermore, there is a major rule capture problem. Our rule editor is designed for a business user. It provides an intuitive environment for capturing rules and resolving logical inconsistencies (e.g., one such inconsistency being rule conflicts). In our implementation, due to the fact that rule conflicts are resolved statically, there is no architectural requirement for dynamic conflict resolution in the rule engine.

FIG. 9 shows a basic architecture of inference engines. This architecture is driven by the dynamic conflict resolution requirement of expert systems. Each rule's premises are pattern matched against the known facts. All rules whose premises are fully matched are activated and placed on the agenda (conflict set). Activated rules are only fired one at a time using a conflict resolution algorithm determining which rule to fire next. When a rule fires, it may update the known facts. Before the next rule fires, another pattern match cycle occurs to make sure the agenda is up-to-date. This may also result in deactivating rules on the agenda whose premises are no longer satisfied. The most expensive part of this architecture, in terms of computer resources, is the pattern matching. It can take up to 90% of processing time. This is why there are numerous pattern matching algorithms (e.g. RETE and TREAT), each optimized for a specific problem domain. The pattern match-conflict resolution cycle shown in FIG. 9 allows rules to impact other rules' execution. For example, a rule can deactivate another rule by updating working memory so that the latter rules' premises are no longer satisfied.

FIG. 10 lists three business rules. Rules 1 and 2, as previously discussed, are in conflict with each other. In order to resolve the conflict, let us assume rule 1 overrides rule 2. In order to implement these rules in an inference engine, they are converted to formal logic as shown. However, in order to implement an override, rule priorities are used to insure rule 1 fires first. Furthermore, an additional condition "Person.risk=null" is added to the premises of both rules to make them mutually exclusive (i.e. only one can fire for each Person).

Figure 11:
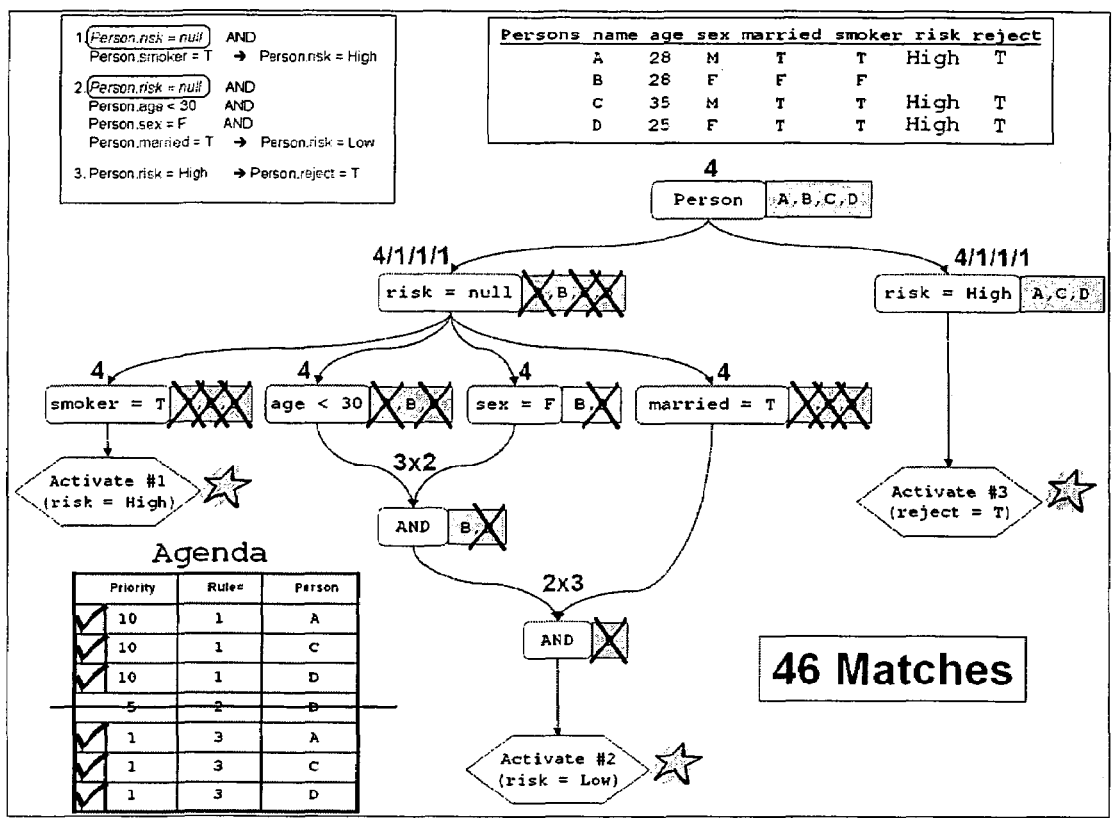
FIG. 11 shows the business rules in FIG. 10 loaded into a RETE inference engine.

FIG. 11 shows a RETE network 450 generated at runtime for the three rules in FIG. 10. The network 450 is a series of pattern-matching nodes with memory (i.e. nodes that recall the previous matches made) and a series of join nodes. Given the working memory of facts in the upper right corner of the diagram, the final state of the RETE network 450 is shown after execution is finished. The final state of the agenda is displayed in the lower left corner. Note that both rules 1 and 2 where placed on the agenda for Person D. However, rule 1 fired first resulting in deactivation of rule 2. The net effect is that rule 1 has overridden rule 2. Therefore, the activation of rule 2 turned out to be unnecessary and a processing overhead. In fact, a total of 24 pattern matches were unnecessarily performed. A grand total of 46 pattern matches were performed to process the rules against the given set of facts.

Figure 12:
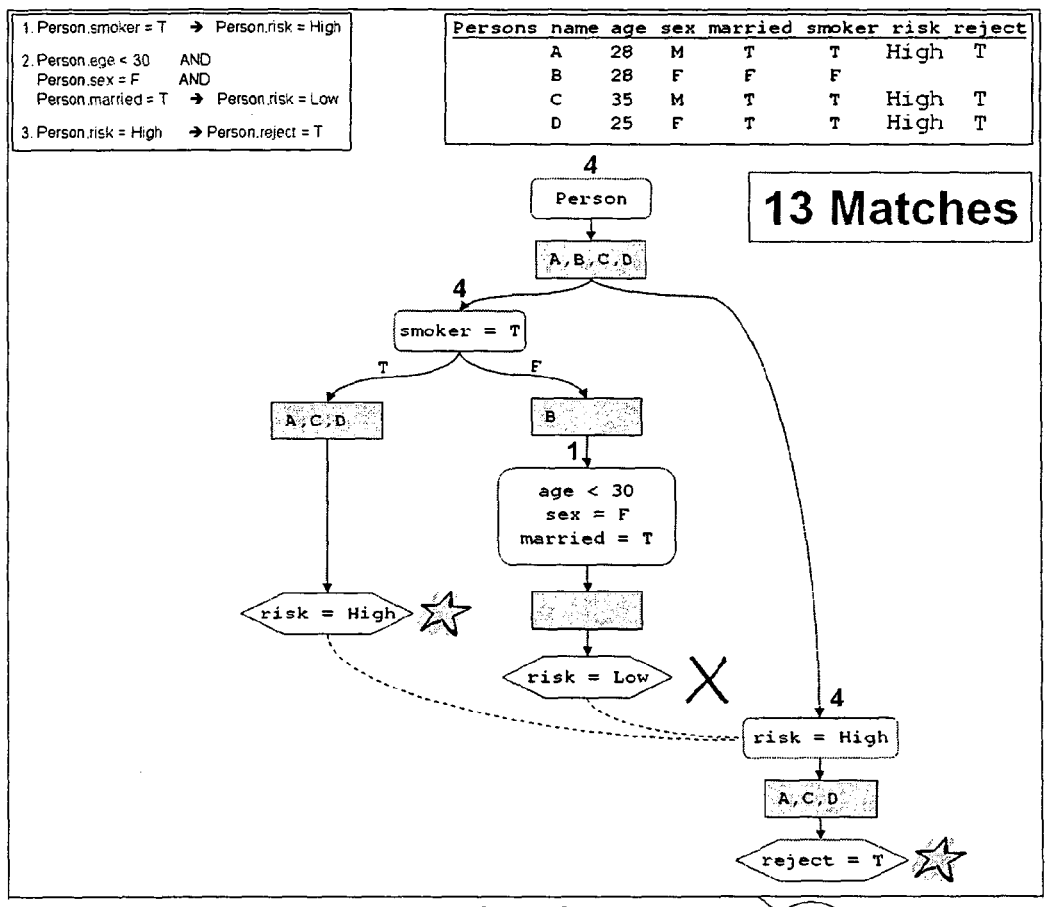
FIG. 12 shows the business rules in FIG. 10 as processed by the invention.

FIG. 12 shows a flow diagram 480 depicting how the same rules (as shown in FIG. 10) are processed using our rule engine. The logic necessary to process the rules is generated using an optimizing business logic generation utility. This utility uses a dependency analysis utility, described below, to determine the logical dependencies across the set of rules. It also takes into account the rule overrides. Rule 3 is dependent on the outcome of both rules 1 and 2 (Person.risk). Therefore, rule 3 is processed after rules 1 and 2 have finished processing. Also, since rule 2 is overridden by rule 1 then only Persons who do not match rule 1's premise (i.e. are non-smokers) are processed by rule 2. FIG. 12 shows the final state of the process. The engine was able to arrive at the same exact outcome in a single-pass and using only 13 pattern matches as opposed to 46 used in the RETE case (of FIG. 11). Furthermore, unlike the RETE network 450 that can only process one activated rule at a time, the engine 480 is capable of a high degree of parallel processing since all logical conflicts have already been resolved at compile time.

Figure 13:
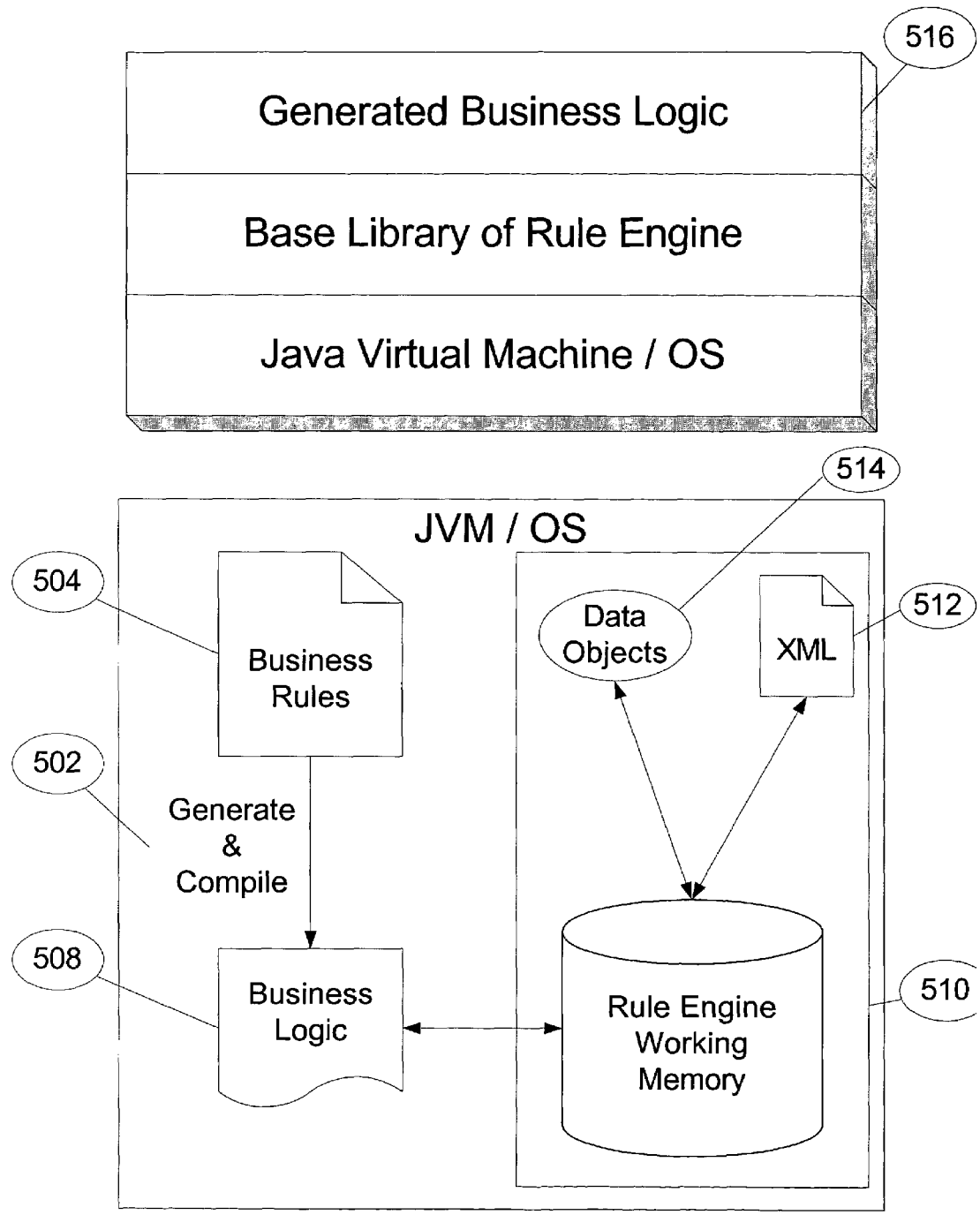
FIG. 13 shows a rule engine architecture.

The same dependency analysis utility can be used in conjunction with various business logic generation utilities, each optimized for a different target programming language. In FIG. 13, a rule engine where the business rules are captured in a declarative high-level language is shown. A code generator/compiler 502 converts rules 504 into low-level business logic 508 coded in and optimized for a programming language, such as, for example, Java, C++, Jython, or JavaScript. A base library 510 that implements the rule engine's working memory is Included. This is analogous to an in-memory relational database. It provides many of the relational algebra operations available in a relational database such as union, intersect, difference, product, restrict project, join, divide, and so forth. The business logic 508 generated is a series of calls to the working memory database to retrieve, manipulate, and update the data.

FIG. 14 includes example JAVA code for processing of the three business rules in FIG. 10.

FIG. 15 includes example Jython code for the processing of the three business rules in FIG. 10.

Referring again to FIG. 13, working memory 510 is ideally implemented using a variation of a relational model. This is because the relational model is proven to be one of the most universal methods of data representation and capable of capturing a large majority of data semantics. Therefore, various types of request message payloads can be transformed to/from the working memory 510. Two of the most popular types of payloads are XML 512 and data objects 514. An intermediate working memory form of data representation allows the generated business logic 508 to be independent of a message payload type. Many inference engine vendors capture rules bound and tightly coupled to the message payload structure. Therefore, a rule set written for an XML message must be rewritten if the message type is to change to, for instance, data objects. Our method relies on a high-level declarative rules capture methodology. The rules are, therefore, independent of the low-level constructs such a message types and structures. This makes for much more portable and reusable rule sets.

In the sample codes shown in FIGS. 14 and 15, tuple set manager (ITSMgr) 518 is rule engine's working memory 510 preloaded with facts/data. The ITSMgr 518 is asked initially to generate tuple sets of the contents of a table (i.e. each tuple representing an instance of a business entity). Then the script associates an alias with the resulting tuple set; this is tantamount to a relational bound variable, described below. The generated business logic 508 in FIG. 13 is a series of statements that fetch tuple sets, and bind them to variables, then apply some relational operations to the tuple sets which in turn can update the tuple sets and the base data.

Some logical problems with multiple bind variables can occur. For example, one might find the same entity in a single rulesheet bound to both alias A and alias B, from a logical perspective. Assume one wants to take a Person entity and break up the instances of Person into two subsets, where one subset is male Persons and another subset is female Persons. One then generates two bind variables, say M and F, and associates conditions with these bind variables. The condition associated with M says that all its tuples must have a sex attribute equal to 'male'. The condition associated with F says that all its tuples must have a sex attribute equal to 'female'. From this point forward M and F represent those two Person subsets.

Some rulesheets can be specified to require iteration due to some intended logical loops in their rule set. When this is the case, the generated business logic 508 in FIG. 13 contains a loop construct. The rule engine iterates through a loop until no more changes to the data are made or a predetermined maximum number of iterations is reached. The latter stop condition is necessary to avoid endless loops. Most business scenarios, however, only need a single pass execution and do not require loop processing.

An advantage of our rule engine is that when the working memory 510 is loaded, all of the associations and relationships between the entities passed in are preserved so that the engine can rapidly traverse such associations without requiring a relational join across entities (tables). The working memory 510 is based on a relational model. However, the working memory 510 also leverages object-orientation concepts such as pointers to efficiently traverse associations. To traverse an association in the relational model, a join is performed across two tables resulting in a cross product, which contains a larger number of records than the original tables. Then typically the large result set is filtered down to the desired set by equating a foreign key field of one table to an associated primary key field of another. Association traversals in the relational model are expensive due to computational intensive nature of such joins. Here when information is passed in, entity associations are tracked as bidirectional pointers so the engine does not have to perform dynamic joins to transverse associations. This is similar to how associations are carried in an object-oriented model, i.e., as object pointers. Our process has an advantage over object models. In our process the object pointers are unidirectional and thus can only be traversed in one direction. The associations are bidirectional and thus can be traversed in both directions. This effectively doubles the expressive power of the rule language.

Our design principle is to perform the most computationally intensive parts of rule processing (e.g. generation of dependency graphs and conflict resolution) at rules capture and business logic generation stage. This removes the burden of having to perform such tasks at runtime, simplifying the rule engine architecture. The rules capture environment and business logic generation utility, thus, become more computationally intensive. In effect, a lot of "smarts" are moved from the rule engine to the rule editor. Clearly removing computational complexity from a runtime environment is always advantageous and results in significantly better performance; e.g. than that of traditional inference engines.

In traditional inference engines, there is a conflict resolution step that is required to dynamically handle conflicting rules, but it is also very computationally intensive. Our approach is to resolve conflict when the business logic is generated for execution, leaving the runtime business logic 508 clean and typically requiring only a single pass.

Figure 16:
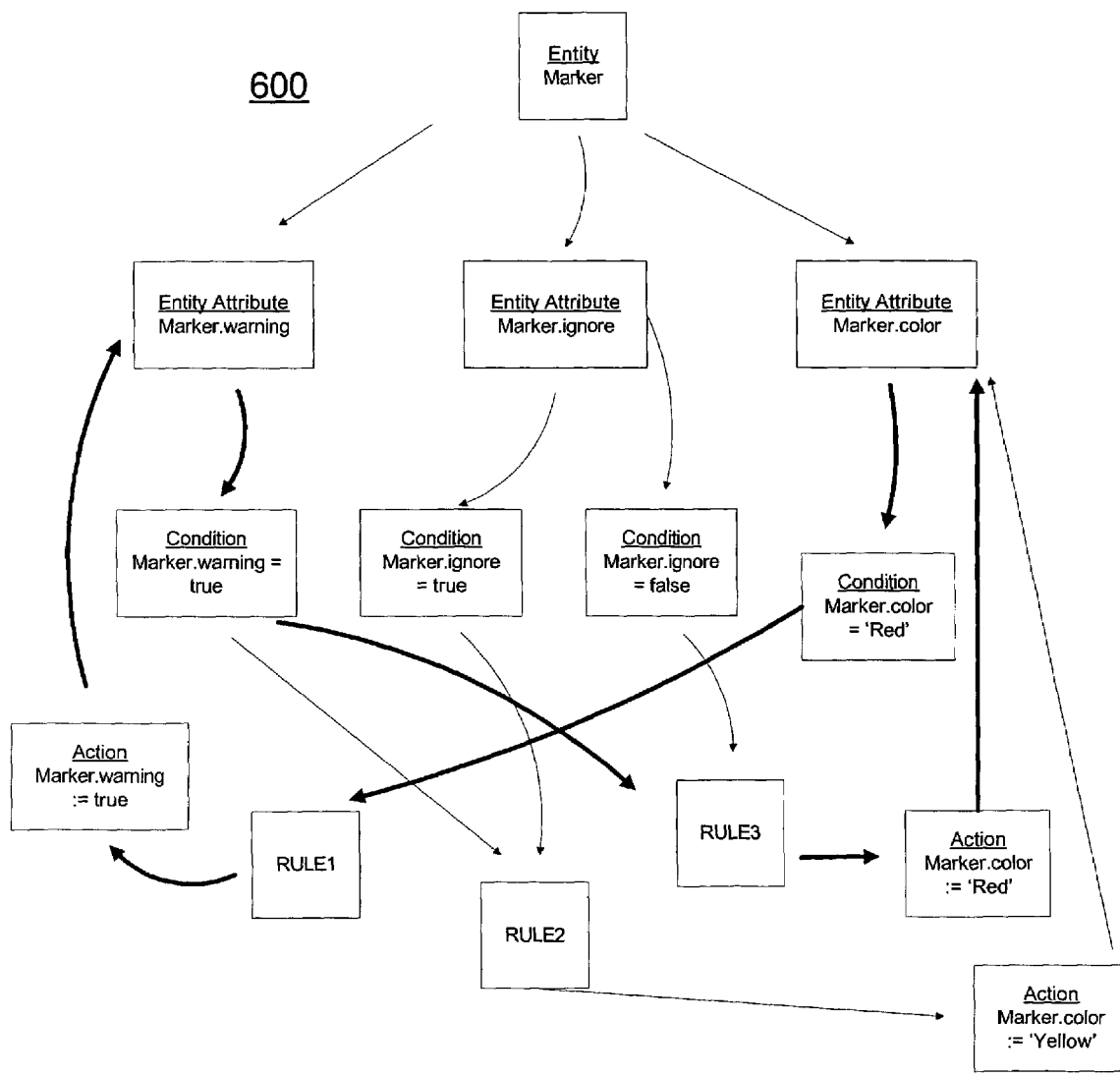
FIG. 16 shows an example dependency graph for three business rules.

Referring to FIG. 16, to accomplish this conflict resolution analysis at business logic generation time a dependency graph 600 is generated for all the rules in the rulepack. This dependency graph 600 contains a node for each data entity, entity attribute, entity collection, conditional expression, action expression, and rule. The graph 600 contains edges from a parent node that affect the rank of a child node. An entity node points to its attribute nodes. An entity node points to a collection node of that entity representing all instances of the entity. An attribute node points to a condition node if the attribute is used in the conditional expression. An attribute node points to an action node if the attribute is used in the action expression. A condition node points to a rule node if the condition is used in that rule. A rule node points to an action node if the action is used in that rule. A rule node points to another rule node if the first rule overrides the second rule. An action node points to an attribute node if the action updates the attribute.

This dependency graph 600 forms a circuit with some start nodes and some end nodes. It is also possible for a subset of nodes to form a closed loop. Such a closed loop is called a convex subset. After the generation of this graph 600, a ranking strategy is applied to rank the nodes such that a child node has a greater value than each of its parent nodes. Also if two nodes are independent of each another (there is no path connecting the nodes) the node that is the more computationally intensive is ranked higher. The ranks are used to determine the order of processing of the nodes and how their computation code appears in the generated business logic.

When a convex subset exists, the generated business logic 516 will iterate and continue processing the nodes until there are no more data changes in the working memory 510. Since the general ranking strategy states that each node must have a rank higher than its parent, the ranking method can result in an endless loop when encountering a convex subset. The method handles this as follows.

Figure 17:
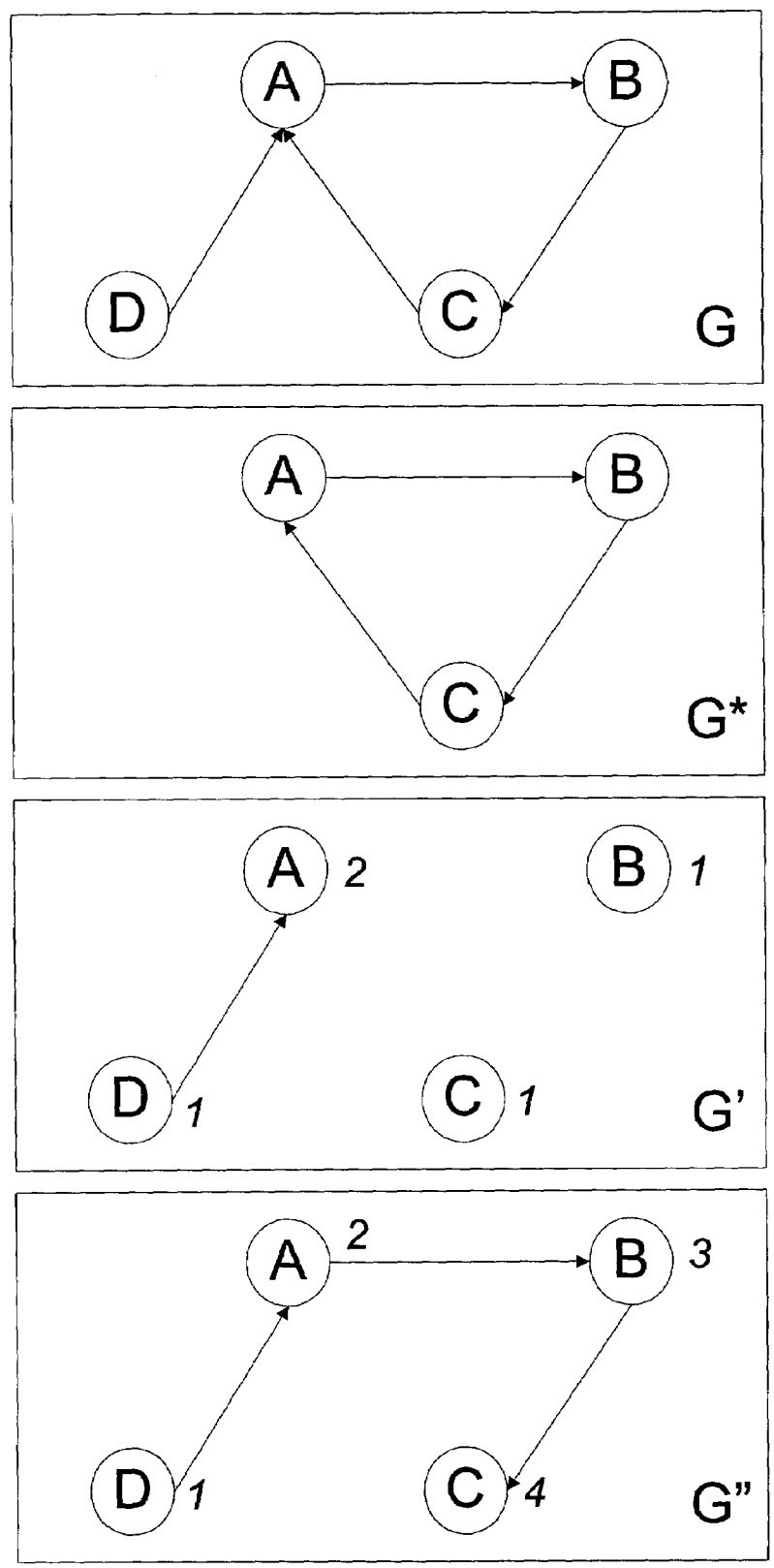
FIG. 17 shows an example dependency graph handling convex subsets (logical loops).

Consider dependency graph G as shown in FIG. 17:
G (Nodes, Edges) such that:
Nodes={A, B, C, D} and
Edges={(A, B), (B, C), (C, A), (D, A)}
The convex subset is shown in graph G*:
G*(Nodes*, Edges*) such that:
Nodes*={A, B, C} and
Edges*={(A, B), (B, C), (C, A)}
To properly rank the nodes, we remove the edges involved in the convex subset (loop) from G resulting in graph G':
G' (Nodes, Edges')=G−G* where:
Edges'={(D, A)}
Now the nodes in G' are ranked according to the general ranking strategy. This results in A=2, B=1, C=1, D=1. We select the node with the highest rank involved in the convex subset as the root of the loop. Therefore, within G* the node A has the highest rank and becomes the root of the convex subset. Now we put the convex subset edges back into G' with the exception of those edges pointing to A, the root. This breaks the loop and allows us to run the general ranking method. The new rankings are A=2, B=3, C=4, D=1 as shown in G". This gives us the optimal sequence of processing. The fact that there is a convex subset in the graph requires special business logic to be generated involving a loop construct to iteratively process the set of rules in the convex subset until no more data changes occur. The ranked dependency graph takes a group of rules and creates an algorithm to test rule conditions and fire rules whose conditions are met.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a High-level procedural or object-oriented programming language or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

Other embodiments are within the scope of the following claims.

What is claimed is:
1. A method comprising:
in a processing system, receiving a rule set as a single package;
generating a dependency graph for the rule set, the dependency graph including a plurality of ranked nodes, the nodes including entity nodes, attribute nodes, condition nodes, and rule nodes, where a first attribute node points to a first condition node when a first attribute associated with the first attribute node is used in a conditional expression associated with the first condition node, a first condition node points to a first rule node when a first condition associated with the first condition node is used in a first rule associated with the first rule node, and where the first rule node points to a second rule node when the first rule overrides a second rule associated with the second rule node; and
generating a sequence of processing logic for optimal processing of inputted facts according to a rank order of the nodes in the dependency graph.
2. The method of claim 1 in which processing comprises single pass execution when there are no logical loops.
3. The method of claim 1 in which processing comprises multi-pass execution when there are logical loops.
4. The method of claim 3 in which processing further comprises providing an endless loop terminating condition.

5. The method of claim 1 in which the rule set is free of logical conflicts.

6. The method of claim 1 in which generating the dependency graph comprises determining logical dependencies across rules contained in the rule set.

7. The method of claim 6 in which generating the dependency graph further comprises resolving logical conflicts using override instructions.

8. The method of claim 7 in which generating the dependency graph further comprises analyzing the rule set with a business logic generation utility optimized for one of a plurality of target programming languages and generating optimized logic for a selected target programming language.

9. The method of claim 8 in which the target programming language is Java.

10. The method of claim 8 in which the target programming language is C++.

11. The method of claim 8 in which the target programming language is Jython.

12. The method of claim 8 in which the target programming language is JavaScript.

13. The method of claim 8 in which the target programming language is Visual Basic.

14. The method of claim 8 in which the target programming language is C#.

15. The method of claim 8 in which the business logic generation utility's generated processing logic comprises a series of calls to a working memory database to retrieve, manipulate and update data.

16. A computer program product, disposed on a computer readable medium, for business processing automation, the program including instructions for causing a processor to:

receive a rule set as a single package;

generate a dependency graph for the rule set, the dependency graph including a plurality of ranked nodes, the nodes including entity nodes, attribute nodes, condition nodes, and rule nodes, where a first attribute node points to a first condition node when a first attribute associated with the first attribute node is used in a conditional expression associated with the first condition node, a first condition node points to a first rule node when a first condition associated with the first condition node is used in a first rule associated with the first rule node, and where the first rule node points to a second rule node when the first rule overrides a second rule associated with the second rule node; and generate a sequence of processing logic for optimal processing of inputted facts according to a rank order of the nodes in the dependency graph.

17. The product of claim 16 in which the rule set is free of logical conflicts.

18. The product of claim 16 in which to generate the dependency graph comprises determining logical dependencies across rules contained in the rule set.

19. The product of claim 18 in which to generate the dependency graph further comprises instructions for causing the processor to:

determine logical conflicts between rules in the rule set; and resolve the logical conflicts with override instructions.

20. The method of claim 1, where the rank order of the nodes is used to determine an order of processing of the nodes, the nodes being ranked such that a child node has a greater value than each of its parent nodes, and where independent nodes are ranked such that a more computationally intensive node is ranked higher.

* * * * *

UNITED STATES PATENT AND TRADEMARK OFFICE
CERTIFICATE OF CORRECTION

PATENT NO. : 7,565,642 B2  
APPLICATION NO. : 10/639674  
DATED : July 21, 2009  
INVENTOR(S) : Eric Andrew Moore and Pedram Abrari Page 1 of 1

It is certified that error appears in the above-identified patent and that said Letters Patent is hereby corrected as shown below:

In the list of references cited by the Examiner on Page 1, Column 2, Line 1 at Other Publications; replace:
"Edward Allen Luke, "A Ruke-based specification system for compu-" with
-- Edward Allen Luke, "A Rule-based specification system for compu- --

Signed and Sealed this

Fifteenth Day of December, 2009

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,565,642 B2 |
| APPLICATION NO. | : 10/639674 |
| DATED | : July 21, 2009 |
| INVENTOR(S) | : Moore et al. |

It is certified that error appears in the above-identified patent and that said Letters Patent is hereby corrected as shown below:

On the Title page,

[*] Notice:  Subject to any disclaimer, the term of this patent is extended or adjusted under 35 USC 154(b) by 1017 days.

Delete the phrase "by 1017 days" and insert -- by 1587 days --

Signed and Sealed this

Fourth Day of May, 2010

David J. Kappos
*Director of the United States Patent and Trademark Office*